United States Patent
Oh et al.

(10) Patent No.: US 11,940,156 B2
(45) Date of Patent: Mar. 26, 2024

(54) COOKING APPLIANCE

(71) Applicant: LG ELECTRONICS INC., Seoul (KR)

(72) Inventors: Kwangsuk Oh, Seoul (KR); Ugjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 17/497,456

(22) Filed: Oct. 8, 2021

(65) Prior Publication Data

US 2022/0120448 A1   Apr. 21, 2022

(30) Foreign Application Priority Data

Oct. 19, 2020  (KR) .................. 10-2020-0135205

(51) Int. Cl.
| | |
|---|---|
| *F24C 15/16* | (2006.01) |
| *A47J 27/00* | (2006.01) |
| *A47J 37/06* | (2006.01) |
| *F24C 15/14* | (2006.01) |
| *H05B 6/64* | (2006.01) |

(52) U.S. Cl.
CPC .............. *F24C 15/16* (2013.01); *A47J 27/004* (2013.01); *A47J 37/0629* (2013.01); *F24C 15/14* (2013.01); *H05B 6/6408* (2013.01)

(58) Field of Classification Search
CPC ........ F24C 15/14; F24C 15/16; H05B 6/6408; H05B 6/6473; B65D 81/3446; A47J 27/00; A47J 27/004; A47J 37/01; A47J 37/015; A47J 37/0629; H06B 6/6408; H06B 6/6473
See application file for complete search history.

(56) References Cited

U.S. PATENT DOCUMENTS

| | | | |
|---|---|---|---|
| 5,714,740 A * | 2/1998 | Kelly ................... | H05B 6/6408 219/733 |
| 10,182,681 B1 * | 1/2019 | Hart ...................... | A21B 3/132 |
| 2004/0144773 A1 * | 7/2004 | Kim ....................... | H05B 6/129 219/601 |

(Continued)

FOREIGN PATENT DOCUMENTS

| | | |
|---|---|---|
| DE | 3128944 A1 | 9/1983 |
| EP | 0715128 A2 | 6/1996 |

(Continued)

*Primary Examiner* — Hung D Nguyen
(74) *Attorney, Agent, or Firm* — Bryan Cave Leighton Paisner LLP

(57) ABSTRACT

A cooking appliance having a main body provided therein with a cooking space, a rack formed on a lateral wall of the cooking space, a door configured to open and close the cooking space, and a storage vessel which is held in the rack and in which a food item is placed. The storage vessel may include a first piece having a plurality of removing holes in a portion, in which a food item is placed, in transverse and vertical direction, and at least one bent portion on an edge thereof, a second piece onto which the first piece is mounted, and which has a bent portion at a position corresponding to the bent portion of the first piece, and an insulating member made of an electrically insulating material, disposed on an edge of the first piece, and disposed between the first piece and the second piece.

15 Claims, 10 Drawing Sheets

(56) References Cited

U.S. PATENT DOCUMENTS

| | | | | |
|---|---|---|---|---|
| 2012/0037617 | A1* | 2/2012 | Kim | H05B 6/6494 |
| | | | | 219/725 |
| 2013/0291854 | A1* | 11/2013 | Johnson | A21B 1/245 |
| | | | | 126/21 A |
| 2013/0292375 | A1* | 11/2013 | Jackson | H05B 6/6408 |
| | | | | 99/339 |
| 2014/0318387 | A1* | 10/2014 | Kim | A47J 37/0641 |
| | | | | 99/447 |
| 2018/0152997 | A1* | 5/2018 | Carcano | H05B 6/664 |

FOREIGN PATENT DOCUMENTS

| | | |
|---|---|---|
| EP | 2 133 014 A1 | 12/2009 |
| EP | 2 799 778 A2 | 11/2014 |
| GB | 2 143 707 A | 2/1985 |
| KR | 10-2014-0129534 A | 11/2014 |

* cited by examiner

COOKING APPLIANCE

CROSS-REFERENCE TO RELATED APPLICATION

This application claims priority to and the benefit of Korean Patent Application No. 10-2020-0135205, filed on Oct. 19, 2020, which is hereby incorporated by reference as if fully set forth herein.

TECHNICAL FIELD

This disclosure describes a cooking appliance, and in particular, a cooking appliance having a storage vessel for containing a food item.

BACKGROUND

Details in the background section do not constitute the related art but are given only as background information concerning the subject matter of the present disclosure.

Cooking appliances generally fall into different categories, based on a heat source or a type, and the sort of a fuel. For example, cooking appliances may be categorized as either an open cooking appliance in which food is placed in an open space, or a sealed cooking appliance in which food is placed in a closed space. The sealed cooking appliance may include an oven, a microwave oven, or the like. The open cooking appliance may include a cooktop, a hob, or the like.

For example, in the sealed cooking appliance, a space, in which a food item is placed, is shielded, and the shielded space is heated to cook the food item. The sealed cooking appliance is provided with a cooking space in which a food item is placed and which is shielded when the food item is cooked. In the cooking space, a food item is actually cooked. A heat source is disposed inside or outside of the cooking space to heat the cooking space.

The sealed cooking appliance may include a door that selectively opens and closes the cooking space in a rotatable manner. The door may be installed in a main body in a rotatable manner through a door hinge and rotates around a portion in which the door is coupled to the main body to selectively open and close the cooking space.

A heat source is disposed in an inner space of the cooking space opened and closed by the door, to heat the cooking space. The heat source may include a gas burner, an electric heater, or the like.

When a food item is put into the cooking space of the cooking appliance and heated in a high temperature atmosphere, a large amount of foreign substances, such as fats, oils, or the like, can be produced from the food item. In particular, when meat such as chicken meat is cooked at a high temperature, a large amount of fats can be produced from the meat.

An additional vessel is needed to store the cooked food item such that the cooked food item and the foreign substances are taken out of the cooking space in a state where the cooked food item is separated from the foreign substances.

Thus, there is a growing need for a cooking appliance provided with a vessel ensuring user convenience.

A cooking container for an electronic cooker is disclosed in KR Patent Publication No. 10-2014-0129534 (hereinafter, "related art"). The cooking container of the related art is configured to move such that the cooking container is put into and taken out of a microwave oven cooking appliance. FIG. 13 is a view disclosed in the document of the related art.

The related art has several disadvantages. For example, for the cooking container of the related art, an intake space 17 is disposed in a central portion of a housing 5 supporting a supporter 30 in which an object to be cooked is placed. Accordingly, foreign substances such as fats, oils, or the like, that fall from the supporter 30 will fall to a bottom of the microwave oven, making it difficult to collect the foreign substances and move the same out of the microwave oven.

Additionally, for example, the housing 5 supporting the supporter 30 of the related art is disposed at a constant height. Accordingly, the height at which an object to be cooked is placed cannot be adjusted, thereby causing deterioration of space efficiency in the microwave oven. When an object to be cooked having a small volume is cooked efficiently, the object to be cooked needs to be placed near an upper heater disposed in an upper portion of the microwave oven. However, because the height at which the object to be cooked is placed cannot be adjusted, it is difficult to efficiently cook the object.

Further, for example, because the supporter 30 of the cooking container of the related art has a circular shape, a limited amount of objects to be cooked can be accommodated in the supporter 30. For instance, when the circular supporter 30 is accommodated in a cuboid-shaped microwave oven, the supporter 30 cannot contain large amounts of food items while the microwave oven has a relatively wide space.

Furthermore, cooking appliances can be configured to operate in a heating mode where a food item is heated and cooked using a heating device such as a heater and in a microwave oven mode where the cooking appliances serve as a microwave oven. Thus, there is a need for a cooking appliance provided with a vessel having a structure in which the vessel is not damaged by electromagnetic waves emitted to a cooking space even when the cooking appliance operates in a microwave oven mode.

SUMMARY

According to an embodiment of the present disclosure, there is provided a storage vessel which is built into an oven or the like, wherein the storage vessel has a net structure to separate oils from a food item that produces a large amount of fats and oils while being cooked or fried, and keep the separated oils at a lower end thereof.

According to an embodiment of the disclosure, there is provided a cooking appliance having a storage vessel that contains food items, wherein the storage vessel can be put into and taken out of a cooking space, thereby ensuring user convenience.

According to the an embodiment of disclosure, there are provided a storage vessel that can be used regardless whether a cooking appliance is operating in a microwave oven mode or in a heating mode, and a cooking appliance including the storage vessel.

According to an embodiment of the disclosure, there are provided a storage vessel having a structure configured to reduce cooking time and improve cooking performance, and a cooking appliance including the storage vessel.

According to an embodiment of the disclosure, there is provided a cooking appliance having a structure for collecting oils and other substances produced from a food item that produces a large amount of fats and oils while being cooked or fried, and removing the produced oils from the cooking space.

Aspects, features and advantages of the present disclosure are not limited to those described above. It is understood that other aspects, features and advantages not mentioned above can be clearly understood from the following description and can be more clearly understood from the embodiments set forth herein. Additionally, it is understood that the various aspects, features and advantages described herein can be realized via means and combinations thereof that are described in the appended claims.

According to an embodiment of the present disclosure, a cooking appliance may be provided with a storage vessel which is disposed in a cooking space and in which a food item is placed. The storage vessel may be provided with a first component in which a food item is placed, and a second component supporting the first component, and the first component and the second component may be attached to and detached from each other.

The first component may have a plurality of holes formed in transverse and vertical directions such that foreign substances such as fats, oils, and the like produced from a food item placed in the first component fall to a lower portion of the first component through the holes.

When the first component and the second component are coupled to each other, a bottom portion of the first component and a bottom portion of the second component may be disposed to face each other. Accordingly, the foreign substances falling from the first component may be collected in the bottom portion of the second component.

A plurality of through holes may be formed on a lateral surface of the second component, and heated air, forced by a convection device included in the cooking appliance to move, may flow into a food item placed in the first component through the through holes such that the food item is cooked effectively and quickly.

According to an embodiment of the present disclosure, a cooking appliance may include a main body provided therein with a cooking space, a rack formed on a lateral wall of the cooking space, a door configured to open and close the cooking space, and a storage vessel which is held in the rack and in which a food item is placed.

The storage vessel may include a first piece having a plurality of removing holes formed in a portion, in which a food item is placed, in transverse and vertical directions, and at least one bent portion on an edge thereof, a second piece onto which the first piece is mounted, and which has a bent portion at a position corresponding to the bent portion of the first piece, and an insulating member made of an electrically insulating material, disposed on the edge of the first piece, and disposed between the first piece and the second piece.

The first piece and the second piece may have a base layer made of a material including aluminum and coated with a polytetrafluoroethylene (PTFE) material, such as TEFLON®, and the insulating member may be made of silicone rubber.

The first piece may include a first bottom part having the removing holes, a first bent part disposed on an edge of the first bottom part, bent from the first bottom part and formed at a slant with respect to the first bottom part, a second bent part bent from the first bottom part and disposed in parallel with the first bottom part, and a third bent part bent from the second bent part and disposed across the first bottom part.

The second piece may include a second bottom part disposed to face the first bottom part, a fourth bent part disposed on an edge of the second bottom part, bent from the second bottom part and disposed at a slant with respect to the second bottom part, a fifth bent part bent from the fourth bent part and disposed in parallel with the second bottom part, and a sixth bent part bent from the fifth bent part and disposed at a slant with respect to the second bottom part.

The insulating member may include a first groove in which at least a portion of the second bent part is disposed, and a second groove which is connected to the first groove and in which the third bent part is disposed.

At least a portion of the second bent part and at least a portion of the fifth bent part may be disposed to face each other, and a portion of the insulating member may be disposed between the second bent part and the fifth bent part to prevent contact between the second bent part and the fifth bent part.

The first piece may be disposed between the fourth bent part and the sixth bent part, and a plurality of first through holes may be formed at the sixth bent part.

A plurality of second through holes may be formed at the fourth bent part.

The cooking appliance may further include an edge part bent from the sixth bent part and disposed in parallel with the second bottom part.

The edge part may include a pair of first cells disposed to face each other on an edge of the second piece, and a pair of second cells disposed to face each other on the edge of the second piece in a direction across a direction in which the pair of first cells face each other, and having a width greater than a width of the first cells.

The second cell may be provided with a depression having a predetermined width, length and shape and formed in a way that a portion of the second cell is pushed down.

The second cell may be mounted onto the rack and disposed in the cooking space.

The first piece and the second piece may be attached to and detached from each other, and the first piece and the insulating member may be attached to and detached from each other.

The cooking appliance may further include an upper heater disposed in an upper portion of the cooking space and disposed to face a surface of an upper side of the first piece, and a convection part disposed to face a lateral surface of the storage vessel and allowing heated air to flow to the storage vessel.

A storage space for storing foreign substances having passed through the removing holes may be formed between a lower surface of the first piece and a bottom surface of the second piece.

According to an embodiment of the present disclosure, cooking appliance may include a plurality of removing holes formed at a first piece, where a food item is placed, and formed into a net structure. Accordingly, even when large amounts of fats and oils are produced from a food item during a cooking process, the produced fats and oils may be easily separated from the food item.

Additionally, the fats and oils flowing down through the removing holes may be stored in a second piece having a closed bottom surface, and the fat and oils flowing down may be easily moved out of a cooking space. When the food item is moved after the cooking process, the fats, oils and the like may be prevented from falling down to a bottom of the cooking space or an indoor floor outside the cooking space.

The cooking appliance according to an embodiment of the disclosure may be provided with the first piece which is easily held in a rack and disposed in a cooking space and in which a food item is placed, and the second piece on which foreign substances such as fats, oils and the like produced from a food item pile, and a user may readily separate the first piece from the second piece and wash the first piece and the second piece, thereby ensuring improvement in user convenience.

A storage vessel according to an embodiment of the disclosure may include an insulating member disposed in a portion where the first piece and the second piece contact each other such that the insulating member prevents direct contact between the first piece and the second piece and spaces the first piece from the second piece, thereby effectively preventing a spark caused by the mutual contact between the first piece and the second piece that are made of a conductive material.

Additionally, the storage vessel according to an embodiment of the disclosure may include the second piece provided with a first through hole and a second through hole, and air passing through the first through hole and the second through hole may effectively heat a food item placed in the first piece, thereby reducing cooking time of the cooking appliance and improving cooking performance thereof.

The storage vessel according to an embodiment of the disclosure may be held in a rack disposed on both lateral walls of the cooking space and having multiple steps such that the storage vessel is held in each step of the rack based on an algorithm for cooking of a food item. Thus, a distance from the storage vessel to an upper heater disposed on an upper side of the storage vessel may be adjusted, and space efficiency of the cooking space may be enhanced.

Further, the storage vessel according to an embodiment of the disclosure may be formed into a rectangular shape entirely when viewed from an upper surface of the storage vessel. The rectangular storage vessel may accommodate larger amounts of food items than a circular storage vessel. In particular, when the storage vessel is disposed in the cooking space having a cuboid shape, the rectangular storage vessel may ensure higher space efficiency than the circular storage vessel.

Specific effects are described along with the above-described effects in the section of Detailed Description.

BRIEF DESCRIPTION OF DRAWING

The accompanying drawings constitute a part of the specification and illustrate one or more embodiments in the disclosure, and together with the specification, explain the disclosure.

DETAILED DESCRIPTION

Figure 1:
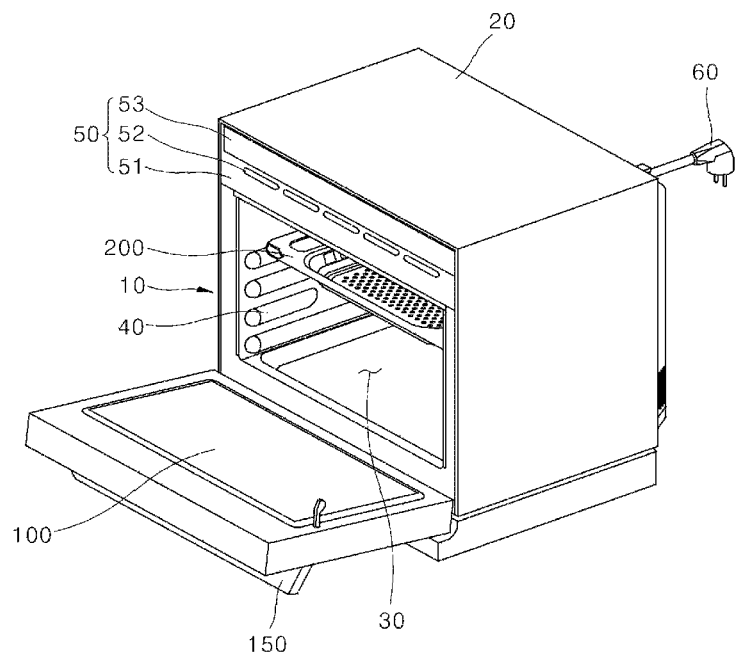
FIG. 1 is a perspective view showing a cooking appliance according to an embodiment of the present disclosure.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The terms "first", "second" and the like are used herein only to distinguish one component from another component. Thus, the components should not be limited by the terms. Certainly, a first component can be a second component unless stated to the contrary.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Figure 2:
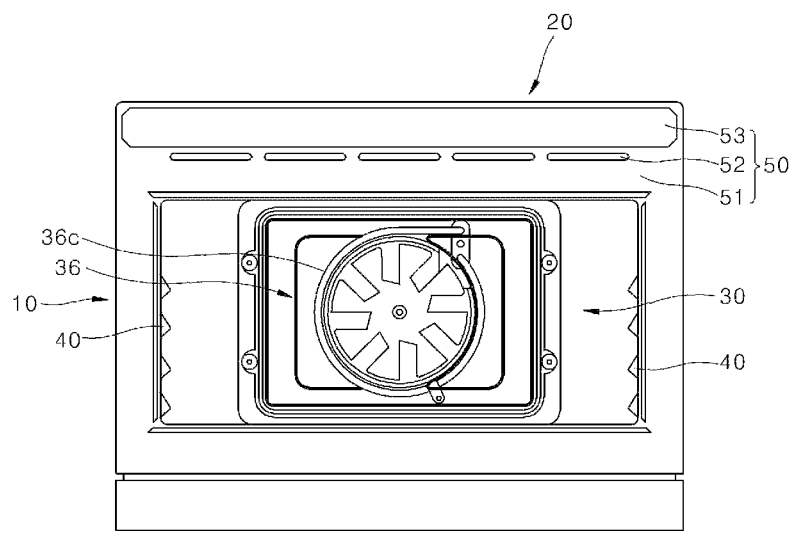
FIG. 2 is a front view showing the cooking appliance in according to an embodiment of the present disclosure, and for clarity of illustration, the cooking appliance is shown without a door.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present FIG. 1 is a perspective view showing a cooking appliance according to an embodiment of the present disclosure. FIG. 2 is a front view showing the cooking appliance illustrated in FIG. 1. In FIG. 2, a door 100 is omitted for clarity of description.

Referring to FIGS. 1 and 2, an exterior of the cooking appliance in one embodiment of the present disclosure may be formed by a main body 10. The main body 10 may be provided therein with a cooking space 30, and may have an approximately rectangular cuboid shape (not limited thereto). The main body 10 may be made of a material having a predetermined strength to protect components installed in an inner space thereof.

As shown, the cooking space 30 may be formed into a cuboid shape, a front surface of which is open. When the cooking space 30 closed, an inner space of the cooking space 30 may be heated to cook a food item.

An upper heater 34 may be disposed on or near an upper side of the cooking space 30. The upper heater 34 may heat the inner space of the cooking space 30 from above. Additionally, a convection part 36 may be additionally disposed on a rear side of the cooking space 30. The convection part 36 may heat the inner space of the cooking space 30 as a result of convection of hot air. The upper heater 30 and the convection part 36 are described with reference to the drawings, below.

A rack 40 may be disposed on both lateral walls of the cooking space 30. A storage vessel 200 containing a food item may be held or supported by the rack 40. To adjust a height of the storage vessel 200 containing a food item, the rack 40, as illustrated in FIGS. 1 and 2, may have a plurality of steps.

The storage vessel 200 may have a structure in which when a food item produces or releases large amounts of fats and oils or the like during a cooking process such as a frying process, the produced fats and oils are easily moved out of or removed from the cooking space 30 and prevented from contaminating the inner space of the cooking space 30 or flowing onto an indoor floor outside the cooking space.

The storage vessel 200 may be disposed in the cooking space 30 and used for placing a food item therein. A user may place a food item to be cooked in the storage vessel 200 and dispose the storage vessel 200 on the rack 40 to cook the food item. One embodiment of the storage vessel 200 is described with reference to the drawings, below.

The door 100 may be formed into a cuboid shape having a predetermined thickness. The door 100 may be provided with a handle 150 configured to be gripped by the user to rotate the door 100 on a front surface thereof. The user may open and close the door 100 using the handle 150.

An electronic component space 54 (see FIG. 4) may be formed in a space separate from the cooking space 30 on the upper side of the cooking space 30 in the inner space of the main body 10.

A control panel 51, an input part 52, and a display 53 may be disposed on a front surface of the electronic component space 50, and the cooking appliance may have a structure in which the front surface of the electronic component space 50 is shielded by the control panel 51, the input part 52, and the display 53.

The control panel 51 may be disposed at the electronic component space 50 disposed on an upper side of the door 100. The input part 52 may be disposed on a front surface of the control panel 51, and the input part 52 may allow the user to input a manipulation signal for operating devices installed in the cooking space 30.

The input part 52 may be provided with a plurality of switches configured to be manipulated by the user. Accordingly, the user may input a manipulation signal directly. The manipulation switch of the input part 52, as illustrated in FIGS. 1 and 2, may be formed into a button, for example.

The display 53 may be further disposed on the control panel 51, and the display 53 may provide operation information of the cooking appliance or cooking information of a food item and the like. The user may check various types of information on the cooking appliance through the display 53.

The cooking appliance may be provided with an upper plate 20 that forms an exterior of an upper surface of the cooking appliance, closes an upper surface of the electronic component space 50 of the main body 10 and covers electronic components 54.

Additionally, the cooking appliance may be provided with a plug 60 for connecting external power with the electronic component 54 installed in the electronic component space 50.

Figure 3:
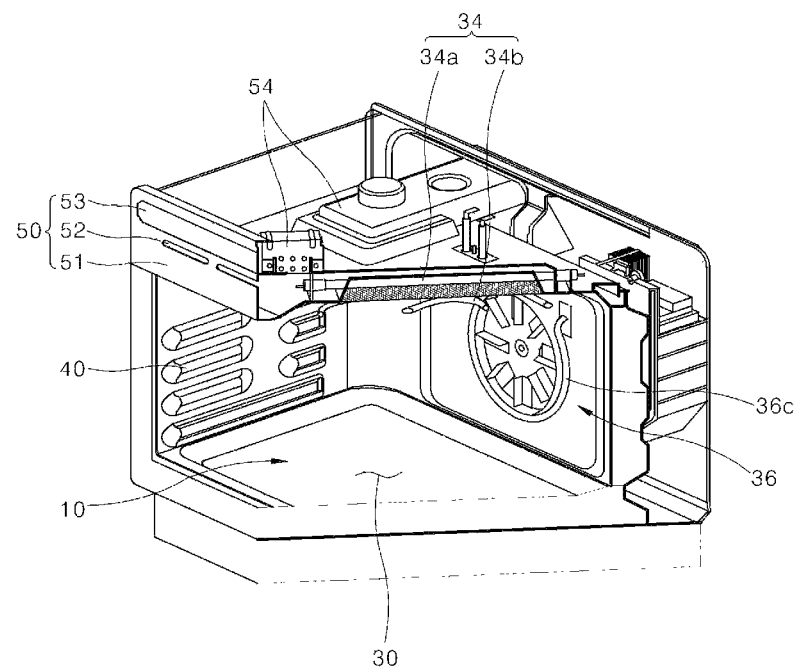
FIG. 3 is a perspective cross-sectional view showing an inside of the cooking appliance according to an embodiment of the present disclosure.
Figure 4:
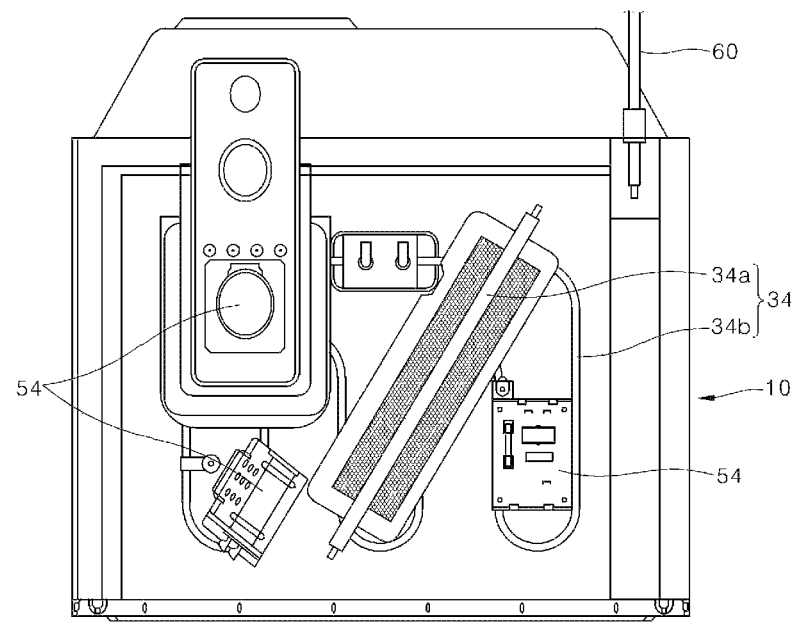
FIG. 4 is a planar cross-sectional view showing an upper portion of the cooking appliance according to an embodiment of the present disclosure.
Figure 5:
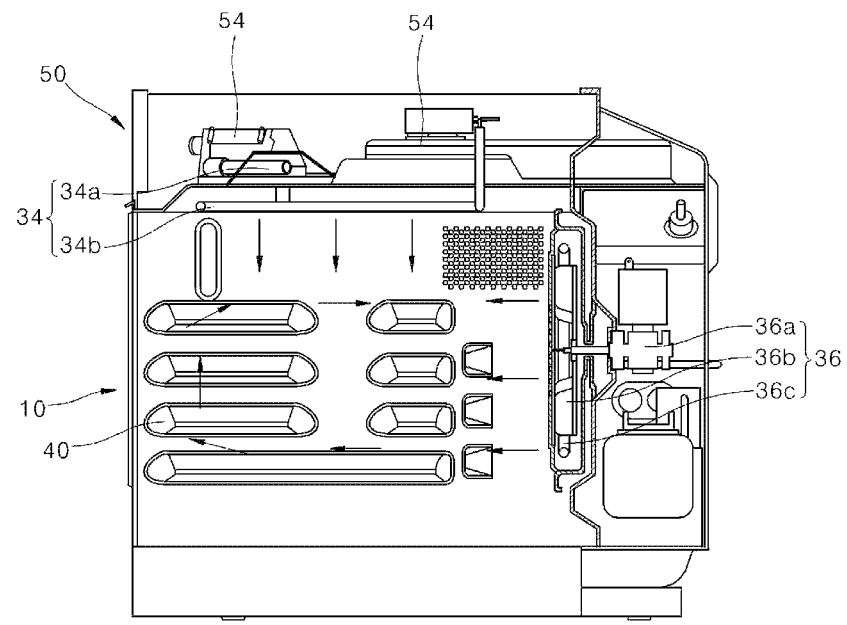
FIG. 5 is a longitudinal cross-sectional view showing the cooking appliance according to an embodiment of the present disclosure.

FIG. 3 is a perspective cross-sectional view showing an inside of the cooking appliance according to an embodiment of the invention. FIG. 4 is a planar cross-sectional view showing an upper portion of the cooking appliance according to an embodiment of the invention. FIG. 5 is a longitudinal cross-sectional view showing the cooking appliance according to an embodiment of the invention.

The upper heater 34, configured to heat the inner space of the cooking space 30 from above, may be disposed on the upper side of the cooking space 30. Thus, the upper heater 34 may be disposed in the cooking space 30 to face a food item placed in the storage vessel 200 installed in the cooking space 30.

Accordingly, the upper heater 34 may cook the food item by applying radiant heat to the food item. Heat emitted from the upper heater 34 may heat air in the cooking space 30, and the heated air may be allowed to flow by the convection part 36 described below. Thus, the upper heater 34 may apply convection heat to the food item.

The upper heater may include a first heater 34a and a second heater 34b. The first heater 34a, for example, may be a carbon heater made of a carbon material, which can be heated quickly and has a high temperature. The second heater 34b, for example, may be a sheath heater in which a coil-shaped electro thermal wire is built into a protecting pipe. It is understood that the first and second heaters are not limited to a carbon heater and a sheath heater.

The upper heater 34, in which two different types of heaters are combined, may apply intense heat to a food item and reduce time spent cooking the food item.

The convection part 36 may be further disposed on the rear side of the cooking space 30, and the convection part 36 may heat the inner space of the cooking space 30 as a result of convection of hot air.

The convection part 36 may include a convection motor 36a, a convection fan 36b rotated as a result of operation of the convection motor 36a and allowing air in the cooking space 30 to flow, and a convection heater 36c configured to surround the convection fan 36b and heat flowing air.

The convection part 36 may heat air in the inner space of the cooking space 30 and force the air to flow. Since the convection part 36 heats the air in the inner space of the cooking space 30 and forces the air to flow, the inner space of the cooking space 30 may be heated and a food item in the inner space of the cooking space 30 may be substantially uniformly heated.

Referring to FIG. 5, heat emitted from the upper heater 34 may be delivered from the upper side of the cooking space 30 to a lower side thereof in the form of radiant heat, as indicated by the downward arrows in the upper portion of the cooking space in FIG. 5.

The convection part 36 may circulate air in the cooking space 30 to uniformly heat the entire cooking space 30, as indicated by the arrows in a central portion of the cooking space in FIG. 5.

The cooking appliance in the embodiment may be provided with an electromagnetic wave generating device as an electronic component 54 to radiate electromagnetic waves to the cooking space 30. Accordingly, the cooking appliance may serve as a microwave oven. The user may use the cooking appliance in a heating mode or in a microwave oven mode as a result of control over the input part 52 such that the cooking appliance is selectively used as a heating and cooking device or a microwave oven.

Additionally, the user may use the cooking appliance in the heating and microwave oven modes as a result of control over the input part 52 such that electromagnetic waves are generated at the same time as the heater included in the cooking appliance is used. Thus, a food item may be cooked using the electromagnetic waves while being heated by the heater.

In this case, the storage vessel 200 may be used to store and cook a food item regardless of the heating mode or the microwave oven mode of the cooking appliance.

Hereunder, an embodiment of the storage vessel 200 which is mounted onto the rack 40 of the cooking space 30 and in which a food item is placed is described with reference FIGS. 6, 7 and 8.

Figure 6:
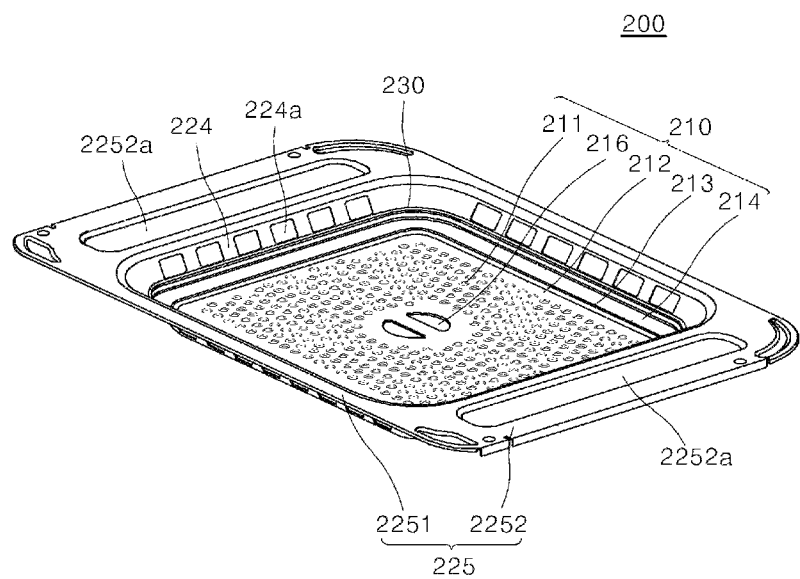
FIG. 6 is a perspective view showing a storage vessel according to an embodiment of the present disclosure.

FIG. 6 is a perspective view showing a storage vessel 200 according to an embodiment of the invention. FIG. 7 is an exploded view of the storage vessel 200 according to an embodiment of the invention. FIG. 8 is a longitudinal cross-sectional view showing the storage vessel 200 according to an embodiment of the invention.

The user may place a food item in the storage vessel 200 and mount the storage vessel 200 on the rack 40 of the cooking space 30 to cook the food item. The storage vessel 200 may store the food item and be stored in the cooking space 30.

The storage vessel 200 may include a first piece 210, a second piece 220, and an insulating member 230. Referring to FIGS. 6 and 7, upper surfaces of the first piece 210 and the second piece 220 may be entirely formed into a rectangle when viewed from above. It is understood that the shape of the storage vessel 200 is not limited to rectangular and may be any shape.

The first piece 210 may include a plurality of removing holes 211 that are disposed in transverse and vertical directions in a portion in which a food item is placed, and include at least one bent portion on an edge thereof.

Since a food item is placed in the first piece 210, foreign substances such as fats and oils may be produced from the food item when the food item is cooked in a high-temperature atmosphere.

For example, when meat such as chicken and the like is heated and cooked in the cooking space 30, fats may be produced from the meat in the cooking space 30. The fats may be splattered or scattered while maintaining its high temperature.

In this case, a structure for separating and removing liquid-or-gel-phase foreign substances, such as fats and oils produced from food items and having a high temperature and a high fluidity, from the food items is needed.

According to an embodiment of the invention, the first piece 210, in which a food item is placed, may include the removing holes 211, and fats, oils and the like produced from the food item may flow to a lower portion of the first piece 210 through the removing holes 211.

The first piece 210 may be mounted onto the second piece 220, and the second piece 220 may have a bent portion at a position corresponding to the bent portion of the first piece 210.

The first piece 210 and the second piece 220 may be attached to and detached from each other. That is, the first piece 210 and the second piece 220 may respectively include the bent portion, on edges thereof, and the bent portions of the first piece 210 and the second piece 220 may be disposed in parallel with each other. In the bent portions, the first piece 210 may be mounted onto the second piece 220 such that the first piece 210 and the second piece 220 serve as a single storage vessel 200.

In the storage vessel 200 of the embodiment, when the first piece 210 and the second piece 220 are coupled together, a storage space 201 for storing foreign substances having passed through the removing holes 211 may be formed between a lower surface of the first piece 210 and a bottom surface of the second piece 220. The storage space 201 may be surrounded and formed mostly by a first bottom part 212 of the first piece 210 and a second bottom part 221 of the second piece 220.

When a food item is cooked in a high-temperature atmosphere, liquid-or-gel-phase foreign substances such as fats, oils, and the like produced from the food item and having a high fluidity may flow to the lower portion of the first piece 210 through the removing holes 211 and be stored in the storage space 201 between the first bottom part 212 and the second bottom part 221.

The user may take the storage vessel 200 out of the cooking space 30 after the cooking process and clean the storage vessel 200 to remove the foreign substances stored in the storage space 201.

The first piece 210 and the second piece 220 may be made of the same material, and the material may include metal having good thermal conductivity properties, for example. Accordingly, the first piece 210 and the second piece 220 may be provided with a base layer that is made of aluminum or an alloy including aluminum exhibiting excellent thermal conductivity, heat resistance and corrosion resistance, but is not limited thereto.

The first piece 210 and the second piece 220 may include a base layer made of another type of metal or non-metal exhibiting good thermal conductivity properties.

The base layers of the first piece 210 and the second piece 220 may be coated with a material that helps to improve durability. For example, a polytetrafluoroethylene (PTFE) material, such as TEFLON®, ensuring durability and good heat resistance may be used to coat the base layers.

Accordingly, for the first piece 210 and the second piece 220, the base layers made of a material including aluminum may be coated with a polytetrafluoroethylene (PTFE) material, such as TEFLON®.

The insulating member 230 may be made of an electrically insulating material, and may be mounted onto the edge of the first piece 210 and disposed between the first piece 210 and the second piece 220.

The insulating member 230 may be entirely formed into a ring and mounted onto the edge of the first piece 210, and when the first piece 210 is mounted onto the second piece 220, may prevent direct contact between the first piece 210 and the second piece 220. Additionally, the insulating member 230 may be made of a flexible material that can be deformed.

To enhance efficiency of thermal conductivity, the first piece 210 and the second piece 220 may be made of a metallic material. In this case, when the first piece 210 and the second piece 220 are made of a conductive metallic material having good electrical conductivity properties, the first piece 210 and the second piece 220 should be electrically insulated.

When the cooking appliance operates in the microwave oven mode in a state in which the storage vessel 200 is in the cooking space 30, electromagnetic waves emitted into the cooking space 30 may produce a spark in the first piece 210 and the second piece 220.

In this case, when the first piece 210 and the second piece 220 made of a conductive metallic material contact each other, a spark may be produced in the contact portion by the electromagnetic waves.

When a coating layer is made of an electrically conductive material or is worn as a result of repetitive use of the storage vessel 200 despite a coating of surfaces of the first piece 210 and the second piece 220 with TEFLON® and the like, a spark is likely to be produced.

The produced spark may damage the storage vessel 200, and devices installed in the cooking appliance, causing failure of the cooking appliance.

According to an embodiment of the invention, the insulating member 230 may be disposed in the portion where the first piece 210 and the second piece 220 contact each other to prevent direct contact between the first piece 210 and the second piece 220 and to space the first piece 210 from the second piece 220, thereby preventing a spark caused by mutual contact of the first piece 210 and the second piece 220 made of a conductive material.

In this case, the insulating member 230 may be made of a material, e.g., silicone rubber exhibiting good corrosion resistance, heat resistance and electric insulation properties.

The cooking appliance may be provided with the storage vessel 200, including the first piece 210 which is readily held in the rack 40, stored in the cooking space 30 and used for placing a food item, and the second piece 220 on which foreign substances such as fats and oils produced from the food item pile, such that the user can separate the first piece 210 and the second piece 22 from each other and wash the same, thereby ensuring improvement in user convenience.

The first piece 210, as described above, may be provided with the removing holes 211, the first bottom part 212, a first bent part 212, a second bent part 214, and a third bent part 215.

The first bottom part 212 may form a bottom of the first piece 210, and allow a food item to be placed on an upper surface thereof, and have the removing holes 211 on the upper surface thereof in the transverse and vertical directions.

Figure 7:
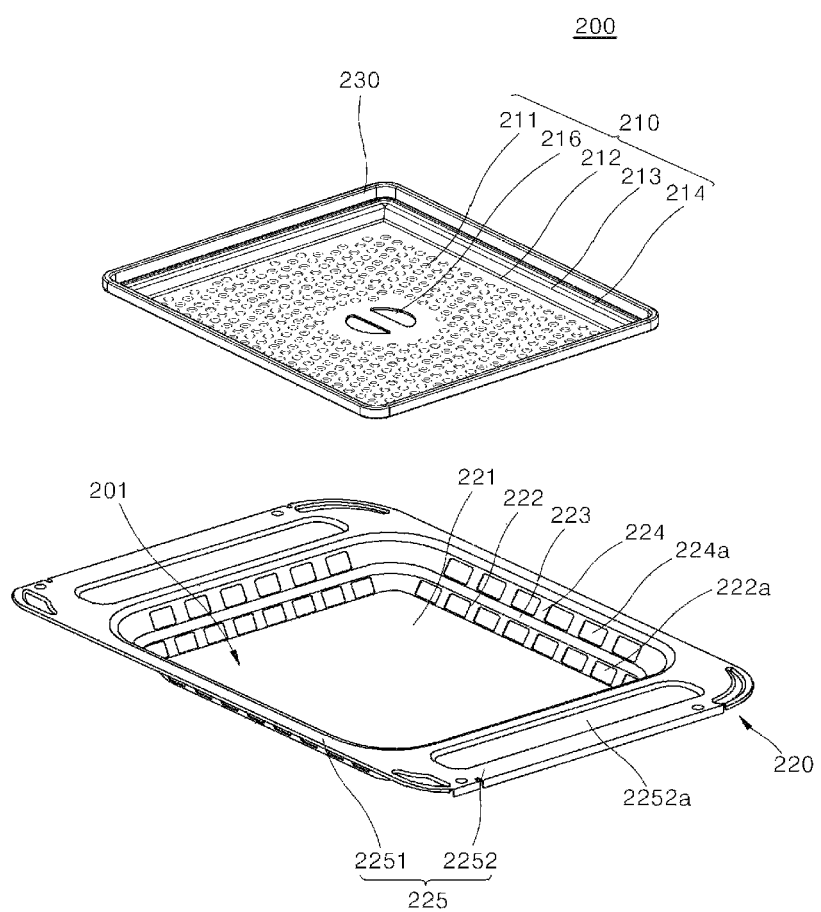
FIG. 7 is an exploded view of the storage vessel according to an embodiment of the present disclosure.

Referring to FIG. 7, the first bottom part 212 may have an approximately rectangular shape and a rounded edge when the first piece 210 is viewed from above. Additionally, the first bottom part 212 may have a handle part 216 at a center thereof such that the user readily handles the first piece 210. It is understood that the shape of the first bottom part 212 is not limited to an approximately rectangular and may be any shape.

The removing holes 211 may be formed in most of the first bottom part 212 in transverse and vertical directions of the first bottom part 212. However, the removing holes 211 may not be formed in the portion where the handle part 216 is formed and on the edge of the first bottom part 212.

The arrangement, diameter and number of the removing holes 211 may be determined based on the cooking conditions of a food item, such as a temperature of the cooking space 30, the type of a food item to be cooked, and the like.

The first bent part 213 may be disposed on the edge of the first bottom part 212, bent from the first bottom part 212 and formed at a slat with respect to the first bottom part 212.

The second bent part 214 may be bent from the first bottom part 212 and disposed in parallel with the first bottom part 212. The second bent part 214 may be a portion where the first piece 210 is held in the second piece 220.

That is, when the first piece 210 is coupled to the second piece 220, the second bent part 214 of the first piece 210 may be held in a fifth bent part 223 of the second piece 220. In this case, the second bent part 214 and the fifth bent part 223 may be disposed in parallel with each other, thereby maintaining a stable coupling between the first piece 210 and the second piece 220.

Figure 9:
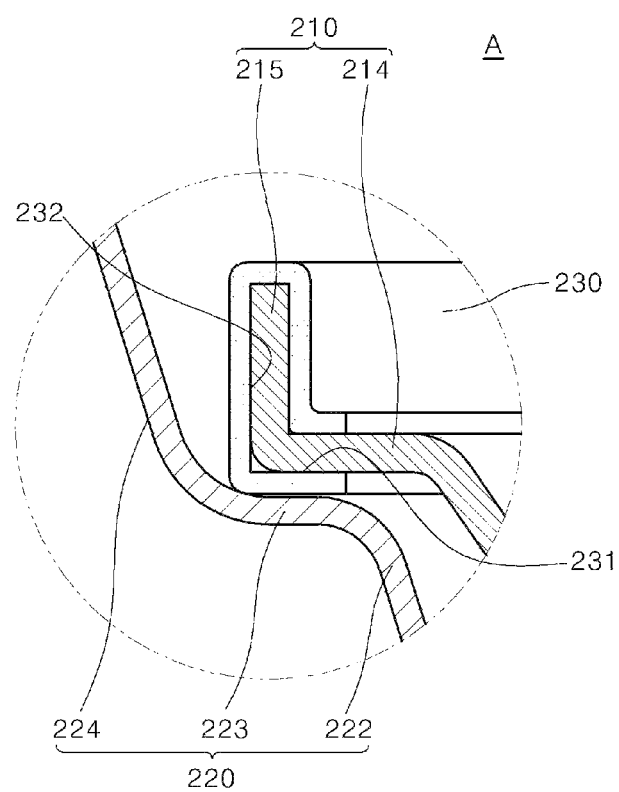
FIG. 9 is an enlarged view showing portion A in FIG. 8.

Referring to FIG. 9, the third bent part 215 may be bent from the second bent part 214 and disposed across the first bottom part 212. Accordingly, the third bent part 215 may be disposed across the second bent part 214 parallel to the first bottom part 212.

The insulating member 230 may be mounted onto the second bent part 214 and the third bent part 215. To keep the insulating member 230 mounted onto the second bent part 214 and the third bent part 215, the insulating member 230 may be form-fitted and interference-fitted into the second bent part 214 and the third bent part 215. To this end, the second bent part 214 and the third bent part 214 may be disposed to cross each other.

The second piece 220 may include the second bottom part 221, a fourth bent part 222, and the fifth bent part 223, and a sixth bent part 224.

The second bottom part 221 may be bent from the fourth bent part 222 and disposed in parallel with the second bottom part 221. When the first piece 210 and the second piece 220 are coupled, the second bottom part 221 may be disposed to face the first bottom part 212 of the first piece 210.

Referring to FIG. 7, like the first bottom part 212, the second bottom part 221 may have an approximately rectangular shape and a rounded edge when the second piece 220 is viewed from above. It is understood that the shape of the second bottom part 221 is not limited to an approximately rectangular and may be any shape.

The second bottom part 221 may form the storage space 201 along with the fourth bent part 222 and the first bottom part 212 of the first piece 210, and foreign substances produced from a food item may pile on an upper surface of the second bottom surface 221.

The fourth bent part 222 may be disposed on the edge of the second bottom part 221, bent from the second bottom part 221 and disposed at a slant with respect to the second bottom part 221.

The fourth bent part 222 may for the storage space 201 of foreign substances along with the first bottom part 212 and the second bottom part 221. That is, when the first piece 210 and the second piece 220 are coupled, the fourth bent part 222 may space a lower surface of the first bottom part 212 and an upper surface of the second bottom part 221 of the second piece 220, to form the storage space 201.

The fifth bent part 223 may be bent from the fourth bent part 222 and disposed in parallel with the second bottom part 221. When the first piece 210 and the second piece 220 are coupled, the fifth bent part 223 may be disposed in parallel with the second bent part 214 of the first piece 210.

Accordingly, the second bent part 214 of the first piece 210 may be stably held in the fifth bent part 223 when the first piece 210 and the second piece 220 are coupled.

The sixth bent part 224 may be bent from the fifth bent part 223 and disposed at a slant with respect to the second bottom part 221.

Figure 8:
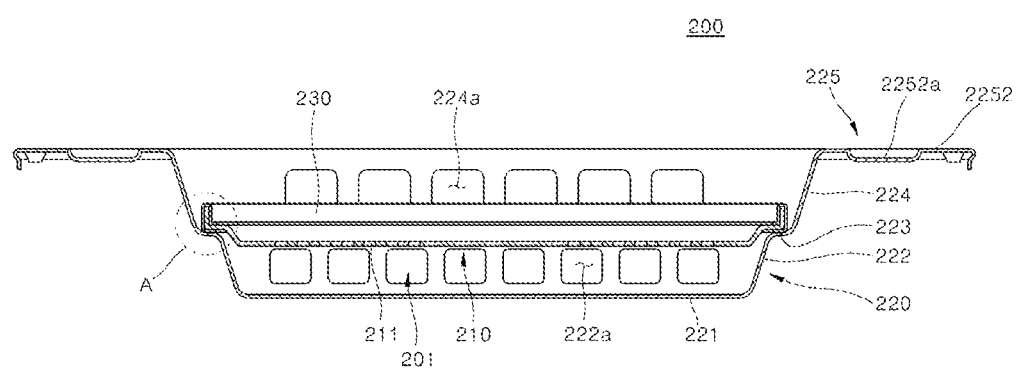
FIG. 8 is a longitudinal cross-sectional view showing the storage vessel according to an embodiment of the present disclosure.

Referring to FIG. 8, when the first piece 210 and the second piece 220 are coupled, the first piece 210 may be held in the fifth bent part 223 and disposed between the fourth bent part 222 and the sixth bent part 224.

The sixth bent part 224 may have a plurality of first through holes 224a. Accordingly, the first through holes 224a may be disposed at a position facing a food item placed on the upper surface of the first bottom part 212 of the first piece 210, when the storage vessel 200 is viewed from a side.

With the structure, air forcibly moved by the convection part 36 may pass through the first through holes 224a and flow into the food item placed in the first piece 210. Thus, heat of the flowing air may be effectively delivered to the food item, thereby reducing cooking time of the cooking appliance and improving cooking performance thereof.

The fourth bent part 222 may have a plurality of second through holes 222a. Accordingly, the second through holes 222a may be disposed at a position facing the storage space 201 disposed between the first bottom part 212 and the second bottom part 221 when the storage vessel 200 is viewed from the side.

With the structure, air forcibly moved by the convection part 36 may pass through the second through holes 222a, and some of the air may heat the lower surface of the first bottom part 212 of the first piece 210. Thus, heat of the flowing air may be effectively delivered to a food item placed on the upper surface of the first bottom part 212, thereby reducing cooking time of the cooking appliance and improving cooking performance thereof.

In the embodiment, the second piece 220 of the storage vessel 200 may be provided with the first through holes 224a and the second through holes 222a, and air passing through the first through holes 224a and the second through holes 222a may effectively heat a food item placed in the first piece 210, thereby reducing cooking time of the cooking appliance and improving cooking performance thereof.

The second piece 220 may be further provided with an edge part 225 bent from the sixth bent part 224 and disposed in parallel to the second bottom part 221. The edge part 225 may be used by the user to hold and move the storage vessel 200 and used for holding the storage vessel 200 on the rack 40 of the cooking space 30.

Accordingly, the edge part 225 may be disposed on an upper surface of the rack 40 of the cooking space 30, and when the storage vessel 200 is taken out of the cooking space 30 and put into the cooking space 30, a lower surface of the edge part 225 may be held in the rack 40 or escape from the rack 40 while sliding with respect to the upper surface of the rack 40.

Additionally, the edge part 225 may suppress deformation of the entire shape of the second piece 220, caused by repetitive use of the second piece 220 in a high-temperature atmosphere, thereby improving the durability of the second piece 220.

The edge part 225 may include a first cell 2251 and a second cell 2252. A pair of first cells 2251 may be disposed to face each other on the edge of the second piece 220.

A pair of second cells 2252 may be disposed to face each other on the edge of the second piece 220 in a direction across a direction in which the pair of first cells 2251 faces each other, and have a width greater than a width of the first cells 2251.

The second cell 2252 may function as a handle that is used by the user to move the storage vessel 200, and may be a portion held in the rack 40. Accordingly, the second cells 2252 may have a width and surface area greater than those of the first cells 2251.

The second cell 2252 may have a predetermined width, length and shape and be provided with a depression 2252a that is formed in a way that a portion of the second cells 2252 is pushed down.

The depression 2252a may compensate for a thickness of the relatively thin second cells 2252 and suppress deformation of the second cells 2252 caused in a high-temperature atmosphere or by external force, thereby improving the durability of the second piece 220.

Additionally, the depression 2252a may guide a movement direction of the storage vessel 200 such that the storage vessel 200 is easily held in the rack 40 or escape from the rack 40, when the storage vessel 200 is mounted onto the rack 40 of the cooking space 30.

FIG. 9 is an enlarged view showing portion A in FIG. 8. The insulating member 230 may include a first groove 231 and a second groove 232. At least a portion of the second bent part 214 of the first piece 210 may be disposed in the first groove 231. The second groove 232 may connect to the first groove 231, and the third bent part 215 of the first piece 210 may be disposed in the second groove 232.

As illustrated in FIG. 9, the first groove 231 and the second groove 232 may be formed to cross each other in a state in which a cross section of the insulating member 230 is viewed. Further, the second bent part 214 and the third bent part 215 may be formed to cross each other in a state in which a cross section of the first piece 210 is viewed.

With the foregoing structure, a portion of the second bent part 214 and the third bent part 215 of the first piece 210 may be formed-fitted, insertion-fitted into and coupled to the first groove 231 and the second groove 232 of the insulating member 230. Since the insulating member 230 is made of a flexible material that is deformable, a coupling member may be readily coupled to the first piece 210.

Accordingly, the insulating member 230 may stay on the edge of the first piece 210 stably. The insulating member 230 made of a flexible material 230 may be separated from the first piece 210.

With the structure described above, the first piece 210 and the insulating member 230 may be attached to and detached from each other.

Referring to FIG. 9, when the first piece 210, onto which the insulating member 230 is mounted, is coupled to the second piece 220, at least a portion of the second bent part 214 of the first piece 210 and at least a portion of the fifth bent part 223 of the second piece 220 may be disposed to face each other.

In this case, a portion of the insulating member 230 may be disposed between the second bent part 214 and the fifth bent part 223 to prevent contact between the second bent part 214 and the fifth bent part 223 and to space the second bent part 214 from the fifth bent part 223.

With the structure, the first piece 210 and the second piece 220 may not contact each other and may be spaced from each other. Accordingly, when the cooking appliance operates in the microwave oven mode, a spark, caused by contact between the first piece 210 and the second piece 220, may be effectively suppressed.

Figure 10:
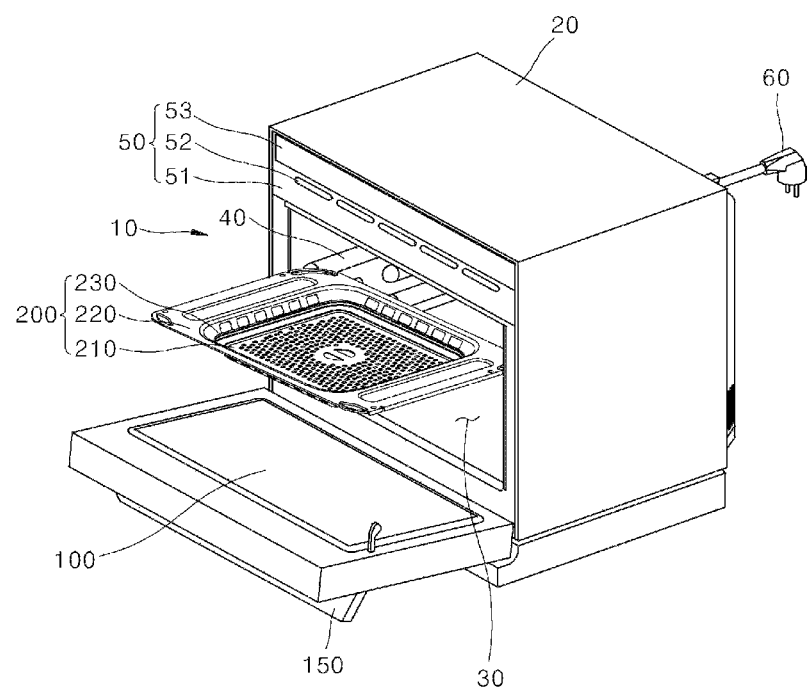
FIG. 10 is a perspective view showing a cooking appliance provided with a storage vessel according to an embodiment of the present disclosure.

FIG. 10 is a perspective view showing a cooking appliance provided with a storage vessel 200 according to an embodiment of the invention.

The coking appliance, as described above, may be further provided with the rack 40 protruding from lateral walls of the cooking space 30. In this case, the second cells 2252 may be mounted onto the rack 40 and disposed in the cooking space 30.

The rack 40 may mount a plurality of steps. Accordingly, the user may place the storage vessel 200 onto an appropriate step of the rack 40 considering the volume, sort and the like of a food item placed in the storage vessel 200.

For example, in the case of a food item having a small volume, the user may place the storage vessel 200 on the upper side of the cooking space 30, near the upper heater 34, such that the food item receives radiant heat from the upper heater 34.

The cooking appliance, as described above, may further include the upper heater 34 disposed in the upper portion of the cooking space 30 to face a surface of an upper side of the first piece 210, and the convection part 36 disposed to face a lateral surface of the storage vessel 200 and allowing heated air to flow to the storage vessel 200.

Thus, a food item, stored in the storage vessel 200 and placed in the cooking space 30, may receive radiant heat from the upper heater 34, and receive convection heat from the convection part 36 to be heated and cooked effectively and quickly.

Figure 11:
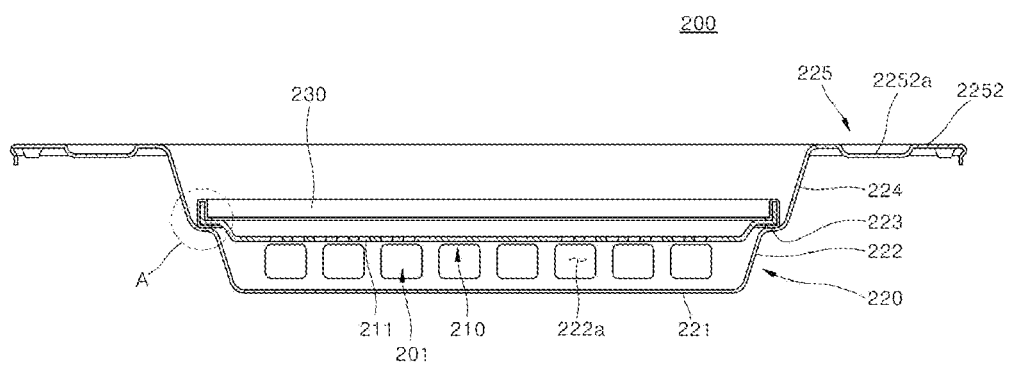
FIG. 11 is a longitudinal cross-sectional view showing a storage vessel according to another embodiment of the present disclosure.
Figure 12:
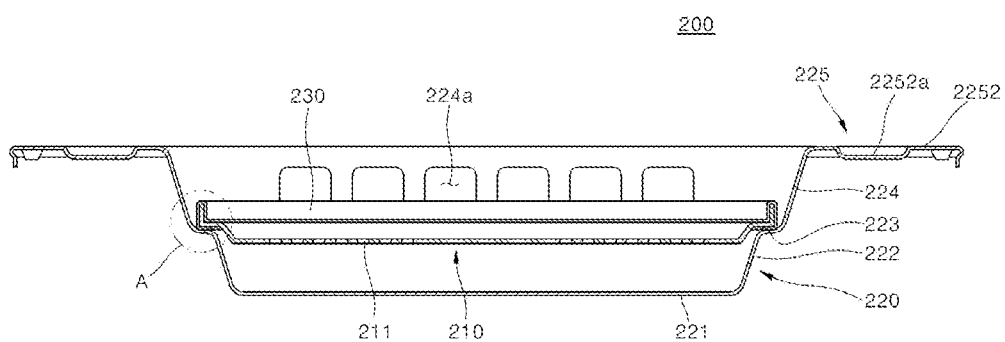
FIG. 12 is a longitudinal cross-sectional view showing a storage vessel according to yet another embodiment of the present disclosure.
Figure 13:
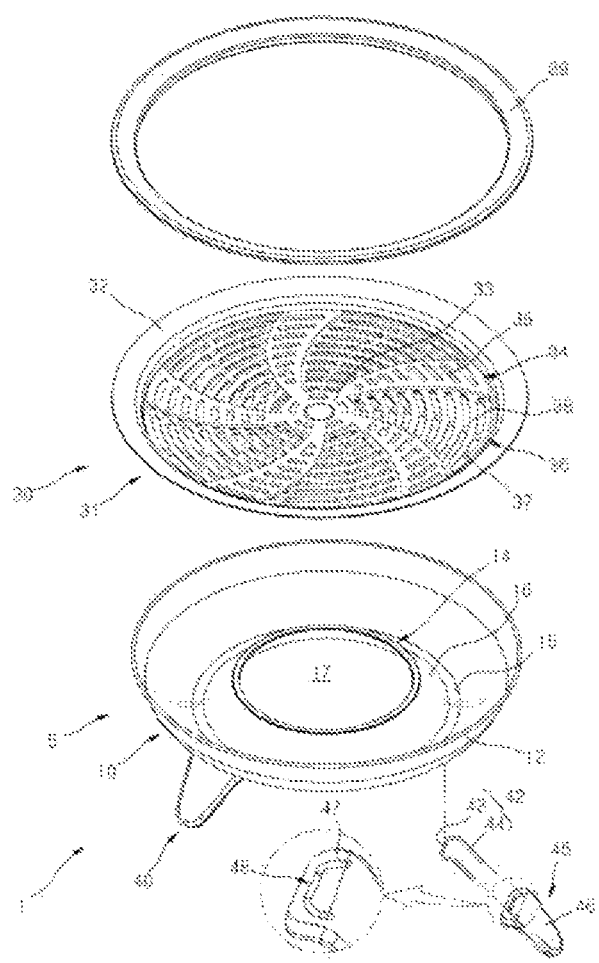
FIG. 13 is a view showing a cooking container of the related art.

FIG. 11 is a longitudinal cross-sectional view showing a storage vessel 200 according to another embodiment of the invention. FIG. 12 is a longitudinal cross-sectional view showing a storage vessel 200 in yet another embodiment of the invention.

As illustrated in FIGS. 11 and 12, in the storage vessel 200 of the embodiments, a through hole may be formed at any one of the fourth bent part 222 or the sixth bent part 224.

For example, the through hole 222a may be formed only at the fourth bent part 222 and may not be formed at the sixth bent part 224, such as illustrated in FIG. 11.

On the contrary, the through hole 224a may be formed only at the sixth bent part 224 and may not be formed at the fourth bent part 222, such as illustrated in FIG. 12.

The structure described-above may be less efficient than the structure, in which the through hole is formed at both of the fourth bent part 222 and the sixth bent part 224, in terms of heat transfer to a food item placed in the first piece 210, but may have improved rigidity and durability of the second piece 220.

In particular, the structure, in which the through hole 224a is formed only at the sixth bent part 224 as illustrated in FIG. 12, may suppress a fall of highly fluid foreign substances, such as fats, oils, and the like, produced or released from a food item and introduced through the removing hole 211, onto the bottom of the cooking space 30 through the through hole formed at the fourth bent part 222 more effectively than the structure in which the through hole is formed at the fourth bent part 222.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

| Description of Reference Numerals | |
|---|---|
| 10: Main body | 20: Upper plate |
| 30: Cooking space | 34: Upper heater |
| 34a: First heater | 33b: Second heater |
| 36: Convection part | 36a: Convection motor |

| Description of Reference Numerals | |
|---|---|
| 36b: Convection fan | 36c: Convection heater |
| 40: Rack | 50: Electronic component space |
| 51: Control panel | 52: Input part |
| 53: Display | 54: Electronic components |
| 60: Plug | 100: Door |
| 150: Handle | 200: Storage vessel |
| 201: Storage space | 210: First piece |
| 211: Removing hole | 212: First bottom part |
| 213: First bent part | 214: Second bent part |
| 215: Third bent part | 216: Handle part |
| 220: Second piece | 221: Second bottom part |
| 222: Fourth bent part | 222a: Second through hole |
| 223: Fifth bent part | 224: Sixth bent part |
| 224a: First through hole | 225: Edge part |
| 2251: First cell | 2252: Second cell |
| 2252a: Depression | 230: Insulating member |
| 231: First groove | 232: Second groove |

What is claimed is:

1. A cooking appliance, comprising:
   a main body that defines a cavity for a cooking space;
   a rack formed on a lateral wall of the cavity;
   a door configured to open and close the cavity; and
   a storage vessel which is supported by the rack, the storage vessel comprising:
   a first piece having a plurality of removing holes formed in a portion thereof in transverse and vertical directions, and at least one bent portion on an edge thereof;
   a second piece on which the first piece is set, the second piece having a bent portion at a position corresponding to the at least one bent portion of the first piece; and
   an insulating member comprising an electrically insulating material, the insulating member disposed on the edge of the first piece and disposed between the first piece and the second piece,
   wherein the insulating member spaces the first piece from the second piece,
   wherein a plurality of first through holes and a plurality of second through holes disposed below the first through holes are formed at a side wall of the second piece,
   a first bottom part of the first piece is disposed between the plurality of first through holes and the plurality of second through holes, the first bottom part partitioning a first space above the first bottom part from a second space below the first bottom part, and the second space is surrounded by the first bottom part and the second piece,
   wherein the first through holes allow air passing through the first through holes to communicate with the first space above the first bottom part, and
   wherein the second through holes allow air passing through the second through holes to communicate with the second space surrounded by the first bottom part and the second piece.

2. The cooking appliance of claim 1, wherein the first piece and the second piece each have a base layer comprising an aluminum material with a Polytetrafluoroethylene (PTFE) coating, and the insulating member comprises a silicone rubber material.

3. The cooking appliance of claim 1, wherein the first piece further comprises:
   the first bottom part having the removing holes formed therein;
   a first bent part disposed on an edge of the first bottom part, bent from the first bottom part and formed at a slant relative to the first bottom part;

a second bent part bent from the first bottom part and disposed in parallel with the first bottom part; and a third bent part bent from the second bent part.

4. The cooking appliance of claim 3, wherein the second piece further comprises:

a second bottom part disposed to face the first bottom part;

a fourth bent part disposed on an edge of the second bottom part, bent from the second bottom part and disposed at a slant relative to the second bottom part;

a fifth bent part bent from the fourth bent part and disposed in parallel with the second bottom part; and a sixth bent part bent from the fifth bent part and disposed at a slant relative to the second bottom part.

5. The cooking appliance of claim 4, wherein the insulating member further comprises:

a first groove in which at least a portion of the second bent part is disposed; and a second groove connected to the first groove and in which the third bent part is disposed.

6. The cooking appliance of claim 4, wherein at least a portion of the second bent part and at least a portion of the fifth bent part are disposed to face each other, and a portion of the insulating member is disposed between the second bent part and the fifth bent part to prevent contact between the second bent part and the fifth bent part.

7. The cooking appliance of claim 4, wherein the first piece is disposed between the fourth bent part and the sixth bent part, and the plurality of first through holes are formed at the sixth bent part.

8. The cooking appliance of claim 4, wherein the first piece is disposed between the fourth bent part and the sixth bent part, and the plurality of second through holes are formed at the fourth bent part.

9. The cooking appliance of claim 4, wherein the cooking appliance further comprises an edge part bent from the sixth bent part and disposed in parallel with the second bottom part.

10. The cooking appliance of claim 9, wherein the edge part comprises:

a pair of first cells disposed to face each other on an edge of the second piece; and a pair of second cells disposed to face each other on the edge of the second piece in a direction across a direction in which the pair of first cells face each other, the pair of second cells having a width greater than a width of the first cells.

11. The cooking appliance of claim 10, wherein each of the pair of second cells has a depression formed therein, the depression having a predetermined width, length and shape formed in a way that a portion of each of the pair of second cells is pushed down.

12. The cooking appliance of claim 10, wherein each of the pair of second cells is disposed on the rack such that the portion of the edge part held on the rack comprises the pair of second cells.

13. The cooking appliance of claim 1, wherein the first piece and the second piece are detachable from each other, and wherein the first piece and the insulating member are detachable from each other.

14. The cooking appliance of claim 1, further comprising:

an upper heater disposed in an upper portion of the cavity and disposed to face a surface of an upper side of the first piece; and a convection heater disposed to face a lateral surface of the storage vessel.

15. The cooking appliance of claim 1, wherein a storage space for collecting foreign substances having passed through the removing holes is formed between a lower surface of the first piece and a bottom surface of the second piece.

* * * * *